United States Patent
Ito et al.

(10) Patent No.: US 10,556,593 B2
(45) Date of Patent: Feb. 11, 2020

(54) SERIES HYBRID VEHICLE

(71) Applicant: TOYOTA JIDOSHA KABUSHIKI KAISHA, Toyota-shi, Aichi-ken (JP)

(72) Inventors: Yoshiaki Ito, Nagakute (JP); Kosuke Aiki, Nagakute (JP); Kisaburo Hayakawa, Nagakute (JP); Hiroyuki Yamaguchi, Nagakute (JP); Hideto Inagaki, Nagakute (JP); Masaki Okamura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/208,725

(22) Filed: Dec. 4, 2018

(65) Prior Publication Data

US 2019/0168761 A1  Jun. 6, 2019

(30) Foreign Application Priority Data

Dec. 5, 2017 (JP) .................................. 2017-233716

(51) Int. Cl.
| | |
|---|---|
| *B60W 30/182* | (2012.01) |
| *B60W 10/02* | (2006.01) |
| *B60K 6/46* | (2007.10) |
| *B60K 6/547* | (2007.10) |
| *B60W 10/08* | (2006.01) |
| *B60W 20/40* | (2016.01) |
| *B60L 50/61* | (2019.01) |

(52) U.S. Cl.
CPC ............ *B60W 30/182* (2013.01); *B60K 6/46* (2013.01); *B60K 6/547* (2013.01); *B60L 50/61* (2019.02); *B60W 10/02* (2013.01); *B60W 10/08* (2013.01); *B60W 20/40* (2013.01)

(58) Field of Classification Search
CPC .... B60W 30/182; B60W 10/02; B60W 10/08; B60W 20/40; B60L 50/61; B60K 6/46; B60K 6/547
See application file for complete search history.

(56) References Cited

U.S. PATENT DOCUMENTS

| | | | |
|---|---|---|---|
| 2004/0204286 A1 | 10/2004 | Stridsberg | |
| 2009/0118880 A1* | 5/2009 | Heap ...................... | B60K 6/365 701/22 |
| 2009/0118919 A1* | 5/2009 | Heap ................... | B60W 40/105 701/54 |

(Continued)

FOREIGN PATENT DOCUMENTS

| | | |
|---|---|---|
| JP | 2010-143310 A | 7/2010 |
| JP | 2013-141872 A | 7/2013 |

*Primary Examiner* — Erez Gurari
(74) *Attorney, Agent, or Firm* — Sughrue Mion, PLLC

(57) ABSTRACT

A series hybrid vehicle is equipped with an engine, a first motor generator, and a second motor generator. The vehicle has a reduction gear that is a first power transmission mechanism for engaging the engine with the first motor generator, a reduction gear that is a second power transmission mechanism for engaging the first motor generator with a vehicle drive shaft, and a clutch that is capable of engaging the first motor generator with one of the two reduction gears in a switching manner. The vehicle further has a transmission that switches between transmission gear ratios and engages the second motor generator with the vehicle drive shaft.

4 Claims, 7 Drawing Sheets

(56) References Cited

U.S. PATENT DOCUMENTS

| | | | | |
|---|---|---|---|---|
| 2009/0118929 A1* | 5/2009 | Heap | ...................... | B60K 6/365 |
| | | | | 701/54 |
| 2012/0115677 A1* | 5/2012 | Sakai | ................... | B60K 6/387 |
| | | | | 477/5 |
| 2013/0053212 A1* | 2/2013 | Naqvi | ................... | B60W 20/00 |
| | | | | 477/4 |
| 2013/0066494 A1* | 3/2013 | Kamijo | ............... | F02N 11/0844 |
| | | | | 701/22 |
| 2015/0021110 A1* | 1/2015 | Ono | ....................... | B60K 6/365 |
| | | | | 180/65.235 |
| 2015/0039194 A1* | 2/2015 | Tsukizaki | ................ | F16H 61/16 |
| | | | | 701/57 |
| 2015/0239466 A1* | 8/2015 | Harada | ................... | B60K 6/445 |
| | | | | 701/22 |
| 2016/0031309 A1* | 2/2016 | Piazza | ..................... | B60K 6/50 |
| | | | | 475/5 |
| 2016/0250917 A1* | 9/2016 | Shibata | .................. | B60K 6/365 |
| | | | | 475/5 |
| 2016/0325735 A1* | 11/2016 | Kato | ...................... | B60K 6/365 |
| 2017/0096058 A1* | 4/2017 | Kanada | ................... | B60K 6/445 |
| 2017/0274754 A1* | 9/2017 | Imamura | ................ | B60K 6/365 |
| 2017/0282702 A1* | 10/2017 | Kim | ....................... | B60K 6/26 |
| 2018/0093556 A1* | 4/2018 | Ochiai | .................... | B60K 6/48 |
| 2018/0106367 A1* | 4/2018 | Mouri | ................... | B60W 20/30 |
| 2018/0147931 A1* | 5/2018 | Toyota | ................... | B60K 6/547 |
| 2018/0236998 A1* | 8/2018 | Ono | ....................... | B60W 20/14 |
| 2019/0118642 A1* | 4/2019 | Cho | ....................... | B60K 6/547 |
| 2019/0118828 A1* | 4/2019 | Karandikar | ........... | B60W 20/50 |
| 2019/0168761 A1* | 6/2019 | Ito | .......................... | B60L 50/61 |

* cited by examiner

# SERIES HYBRID VEHICLE

CROSS REFERENCE TO RELATED APPLICATION

The disclosure of Japanese Patent Application No. 2017-233716 filed on Dec. 5, 2017 including the specification, claims, drawings, and abstract is incorporated herein by reference in its entirety.

TECHNICAL FIELD

The present disclosure relates to a series hybrid vehicle that can travel in various traveling modes.

BACKGROUND

Series hybrid vehicles and parallel hybrid vehicles are known as hybrid vehicles. Series hybrid vehicles use an engine for power generation only, while parallel hybrid vehicles utilize the driving power of the engine even for traveling.

Series hybrid vehicles do not utilize the driving power of the engine directly for traveling, and therefore, they have limited traveling modes compared to parallel hybrid vehicles.

Patent Document 1 discloses controlling power generation such that a secondary battery of a series hybrid vehicle has a higher target SOC value during high-speed traveling than during low-speed traveling. It is thus possible to obtain sufficient driving power even during high-speed traveling as energy for enabling traveling even under a continuous high load.

CITATION LIST

Patent Literature

Patent Document 1: JP 2010-143310 A

Here, high power is required at high vehicle speed and high load, and therefore, a drive motor needs to be made larger accordingly. An inverter for controlling a large-output drive motor is also made to provide larger outputs, which causes cost increase.

SUMMARY

The present disclosure provides a series hybrid vehicle equipped with an engine, a first motor generator, and a second motor generator, and the series hybrid vehicle has a first power transmission mechanism that engages the engine with the first motor generator, a second power transmission mechanism that engages the first motor generator with a vehicle drive shaft, a clutch that is capable of engaging the first motor generator with one of the first power transmission mechanism and the second power transmission mechanism in a switching manner, and a transmission that switches between transmission gear ratios and engages the second motor generator with the vehicle drive shaft.

The series hybrid vehicle further has a controller that changes traveling modes by switching engagement states of the clutch and the transmission, and it preferably includes, as the traveling modes, an EV traveling mode 1 in which the vehicle travels using one of the first motor generator and the second motor generator, an EV traveling mode 2 in which the vehicle travels using both the first motor generator and the second motor generator, an engine power generation mode in which the vehicle travels using the second motor generator while the engine and the first motor generator generate electric power, and a regeneration mode in which one or both of the first motor generator and the second motor generator regenerate electric power.

According to the present disclosure, for a series hybrid car, implementing various traveling modes using a plurality of motor generators enables the motor generators to be relatively low-output ones.

BRIEF DESCRIPTION OF DRAWINGS

An embodiment of the present disclosure will be described by reference to the following figures, wherein.

DESCRIPTION OF EMBODIMENTS

Hereinafter, an embodiment of the present disclosure will be described with reference to the drawings. The present disclosure is not limited to the embodiment disclosed herein.

"Structure"

Figure 1:
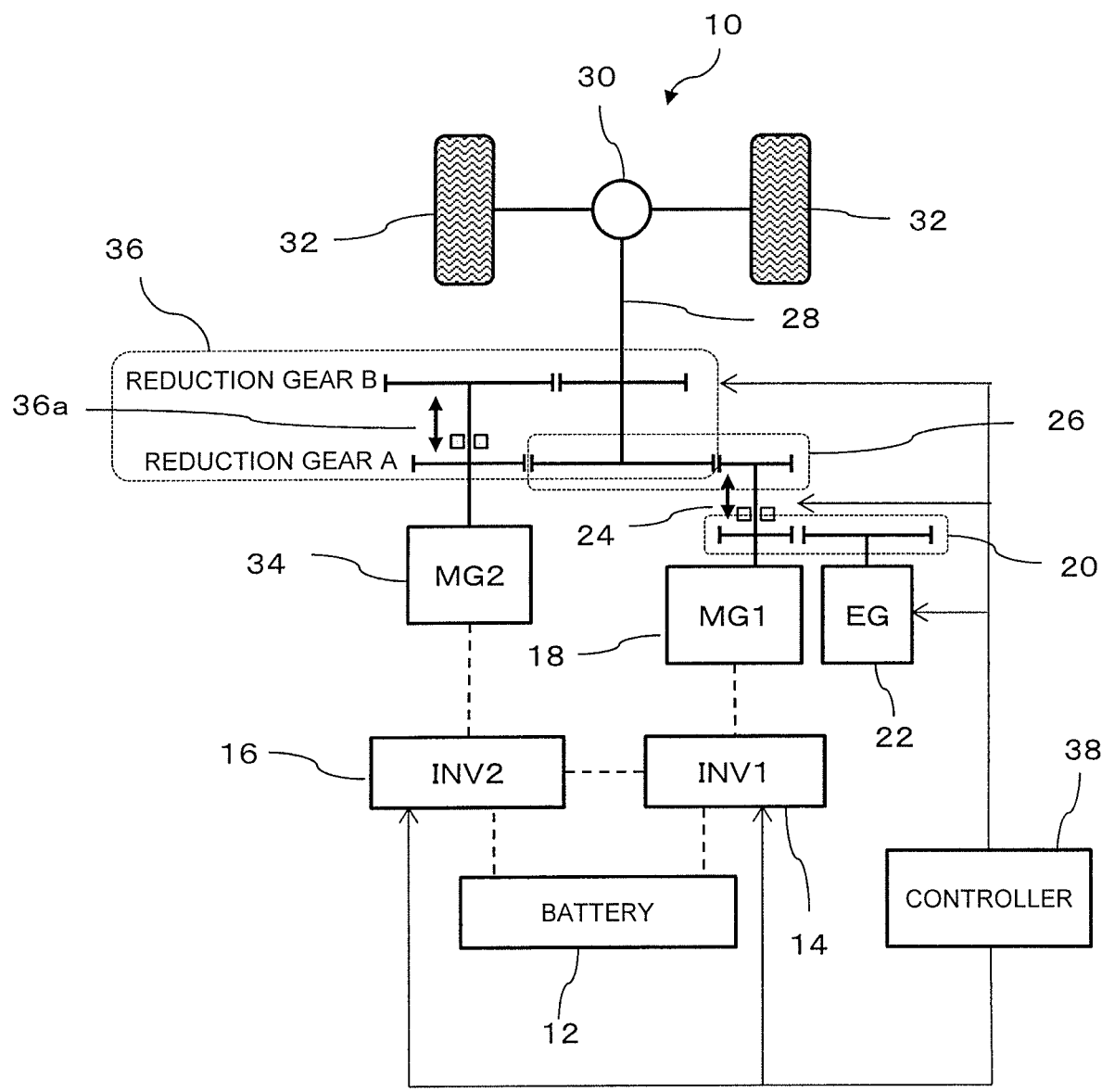
FIG. 1 is a diagram showing an overall structure of a hybrid vehicle according to the present disclosure.

FIG. 1 shows a structure of a series hybrid vehicle 10 according to the present embodiment. A battery 12 is a secondary battery, such as a lithium ion battery or a nickel hydride battery, and is a high-output and high-capacity battery.

The battery 12 is electrically connected to a first inverter (INV1) 14 and a second inverter (INV2) 16. The first and second inverters 14 and 16 convert DC power from the battery 12 to desired AC power. For example, positive and negative bus bars respectively connected to a positive electrode and a negative electrode of the battery 12 have three arms connected therebetween, each arm having two switching elements arranged thereon, and a three-phase output is obtained from a midpoint of the three arms by controlling switching of the six switching elements. It is also possible to convert AC power input from the midpoint of the three arms to DC power by controlling switching of the switching elements, and supply the DC power to the battery 12.

The first inverter 14 is electrically connected to a first motor generator (MG1) 18. Therefore, by controlling the first inverter 14, it is possible not only to drive the first motor\n generator 18 to output power but also to supply to the battery 12 electric power generated by the first motor generator 18.

The drive shaft of the first motor generator 18 is connected to a first reduction gear 20 that is a first power transmission mechanism, and this first reduction gear 20 is connected to a drive shaft of an engine (EG) 22. Therefore, by driving the engine 22, it is possible to drive the first motor generator 18 via the first reduction gear 20 to generate electric power. By supplying the generated electric power to the battery 12 via the first inverter 14, the battery 12 can be charged. Mechanical connection between the first motor generator 18 and the engine 22 may be cut off.

The drive shaft of the first motor generator 18 is connected, via a clutch 24, to a second reduction gear 26 that is a second power transmission mechanism. The second reduction gear 26 is connected to the vehicle drive shaft 28. Therefore, the driving power of the first motor generator 18 can be transmitted to the vehicle drive shaft 28 via the second reduction gear 26 by connecting the clutch 24 to the second reduction gear 26. It is also possible to generate electric power in the first motor generator 18 by transmitting power from the vehicle drive shaft 28 to the first motor generator 18. The vehicle drive shaft 28 is connected to wheels 32 via a differential gear 30, and the driving power of the vehicle drive shaft 28 causes the wheels 32 to rotate to allow the series hybrid vehicle (vehicle) 10 to drive. Further, the series hybrid vehicle 10 is regeneratively braked by performing power generation using power of the vehicle drive shaft 28 generated by the rotation of the wheels 32.

The second inverter 16 is electrically connected to a second motor generator (MG2) 34. Therefore, by controlling the second inverter 16, it is possible not only to drive the second motor generator 34 to output power but also to supply to the battery 12 electric power generated by the second motor generator 34.

The drive shaft of the second motor generator 34 is connected to a transmission 36. This transmission 36 includes a clutch 36a therein which enables switching of a transmission gear ratio between two stages, reduction gear ratio A and reduction gear ratio B. The transmission 36 is connected to the vehicle drive shaft 28. Therefore, by connecting the clutch 36a to the reduction gear ratio A side or the reduction gear ratio B side, the driving power of the second motor generator 34 can be transmitted to the vehicle drive shaft 28 according to the reduction gear ratio A or the reduction gear ratio B. Furthermore, by transmitting power from the vehicle drive shaft 28 to the second motor generator 34, electric power can be generated in the second motor generator 34, thereby regeneratively braking the vehicle. The clutch 36a may also be set to a neutral position that cuts off connection.

The series hybrid vehicle 10 according to the present embodiment has a controller 38, and this controller 38 not only controls the clutch 24 and the transmission 36 but also controls driving of the first motor generator 18, the second motor generator 34, and the engine 22, in order to implement various traveling modes depending on the state of the vehicle.

As such, the present embodiment has, as power sources, (i) the engine 22 that is used to generate electric power and is composed of, for example, an internal-combustion engine and a gas turbine, (ii) the first motor generator 18 that generates electric power mainly using engine output, and (iii) the second motor generator 34 mainly used to drive the vehicle. The present embodiment also includes, as speed reduction devices and speed change devices, (i) the first reduction gear 20 that engages the engine 22 with the first motor generator 18 at a fixed reduction gear ratio, (ii) the second reduction gear 26 that engages the first motor generator 18 with the vehicle drive shaft 28 at a fixed reduction gear ratio, (iii) the clutch 24 that achieves one of three states: the drive shaft of the first motor generator 18 is engaged with the first reduction gear 20; the drive shaft of the first motor generator 18 is engaged with the second reduction gear 26; and the drive shaft of the first motor generator is engaged with neither the first reduction gear 20 nor the second reduction gear 26 (neutral), and (iv) the transmission 36 that engages the drive shaft of the second motor generator 34 with the vehicle drive shaft at two or more different types of transmission gear ratios.

Here, the first motor generator 18 cannot engage with both the vehicle drive shaft 28 and the engine 22 simultaneously. In addition, the transmission 36 has at least two types of reduction gears: a reduction gear for normal traveling (reduction gear ratio A); and a reduction gear for high-speed traveling (reduction gear ratio B).

"Traveling Modes"

The controller 38 then controls operations of the power units, the clutch, and the transmission, thereby implementing various traveling modes. Table 1 shows modes and states of the devices.

TABLE 1

Figure 2:
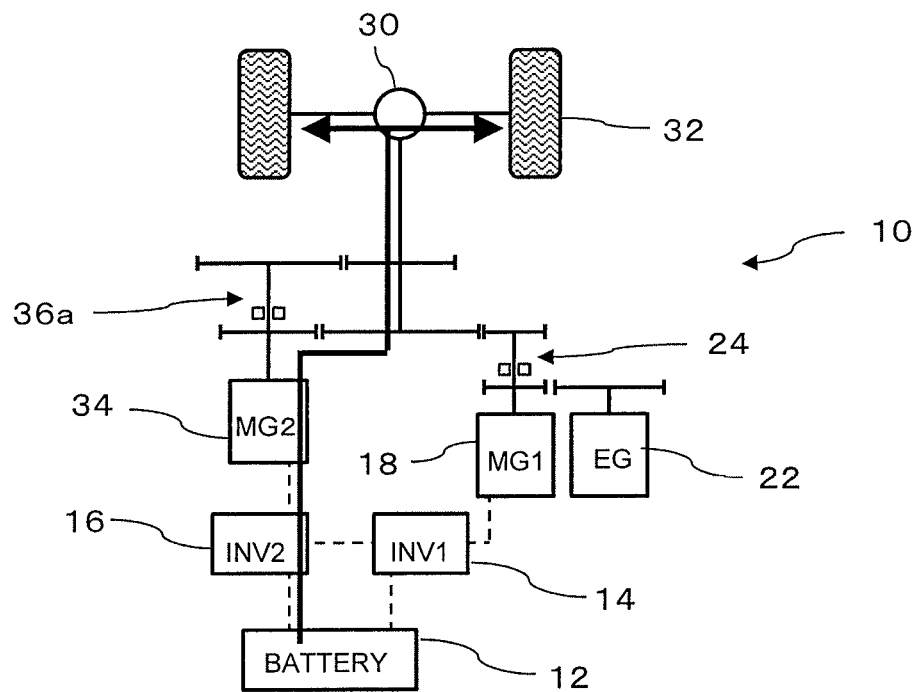
FIG. 2 is a diagram showing a normal state (a second motor generator 34 is driven)
Figure 3:
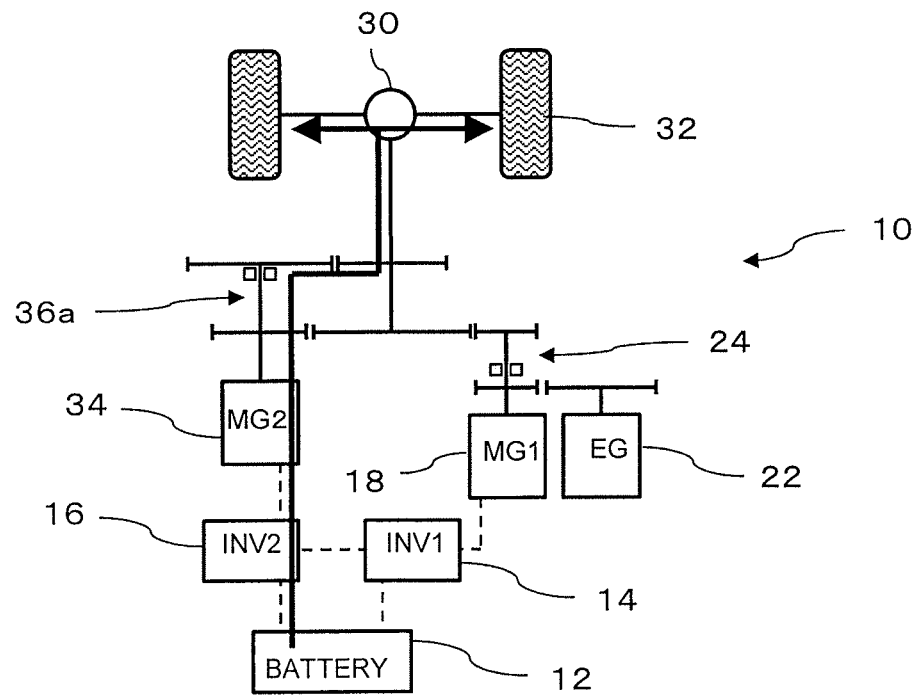
FIG. 3 is a diagram showing a high-speed state (the second motor generator 34 is driven: reduction gear ratio B)
Figure 4:
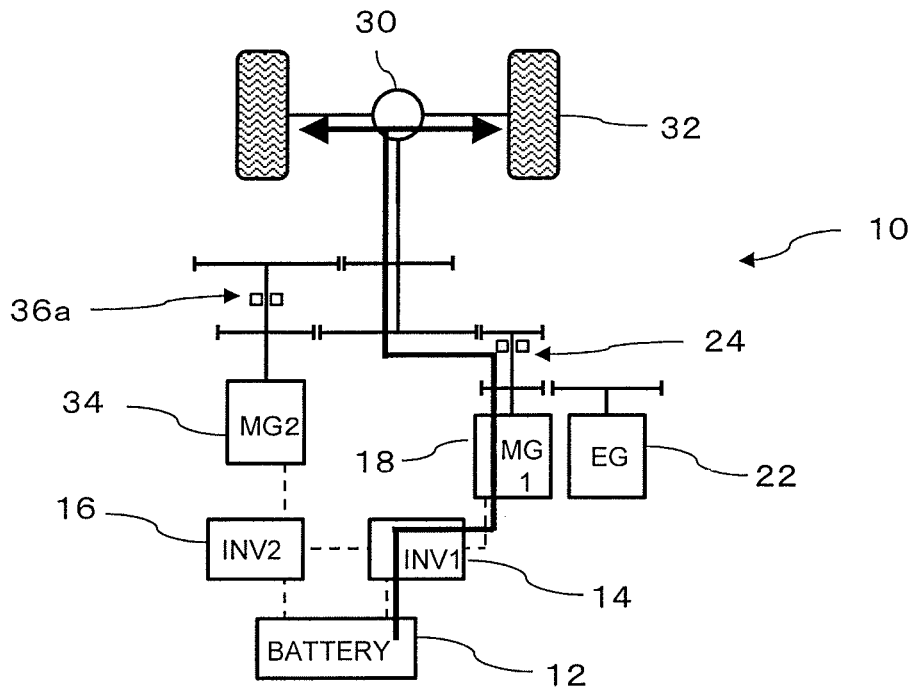
FIG. 4 is a diagram showing a normal state (a first motor generator 18 is driven)
Figure 5:
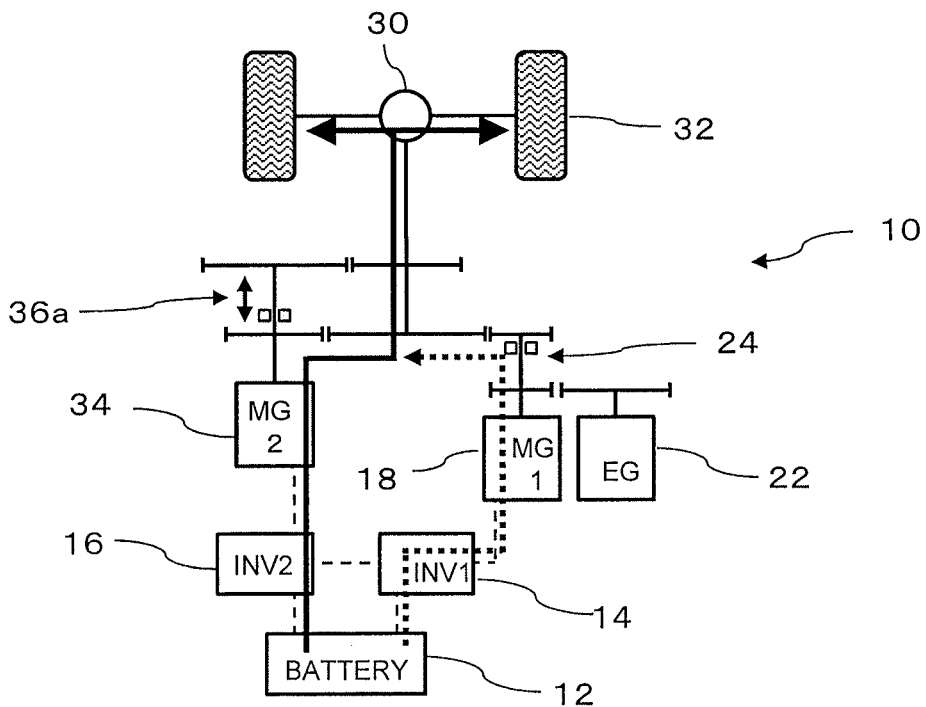
FIG. 5 is a diagram showing a normal state (the first and second motor generators 18 and 34 are driven)
Figure 6:
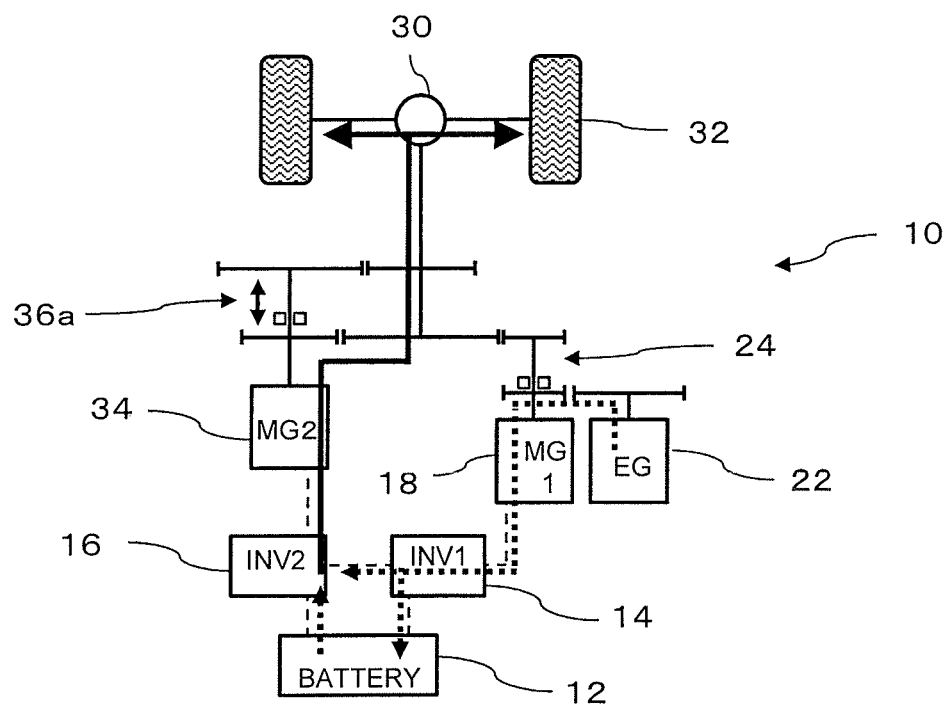
FIG. 6 is a diagram showing the first motor generator 18 generating electric power and the second motor generator 34 driving the vehicle.

| | CLUTCH AND TRANSMISSION | | POWER UNIT | | | | |
|---|---|---|---|---|---|---|---|
| | CLUTCH | TRANSMISSION | EG | MG1 | MG2 | BATTERY | DRAWINGS |
| EV DRIVING | NORMAL STATE | DRIVE SHAFT N | STOP | DRIVE | STOP | DISCHARGE | FIG. 4 |
| MODE 1 (NORMAL DRIVING) | NORMAL STATE | EG or N | REDUCTION GEAR A | ↑ | STOP | DRIVE | ↑ | FIG. 2 |
| | HIGH SPEED | ↑ | REDUCTION GEAR B | ↑ | ↑ | ↑ | ↑ | FIG. 3 |
| EV DRIVING | NORMAL STATE | ↑ | REDUCTION GEAR A | ↑ | DRIVE | DRIVE | ↑ | FIG. 5 |
| MODE 2 (SUDDEN ACCELERATION, etc.) | HIGH SPEED | ↑ | REDUCTION GEAR B | ↑ | ↑ | ↑ | ↑ | ↑ |
| ENGINE POWER GENERATION MODE | NORMAL STATE | EG | REDUCTION GEAR A | DRIVE | GENERATE POWER | DRIVE | CHARGE or DISCHARGE | FIG. 6 |
| | HIGH SPEED | EG | REDUCTION B | ↑ | ↑ | ↑ | ↑ | ↑ |

TABLE 1-continued

Figure 7:
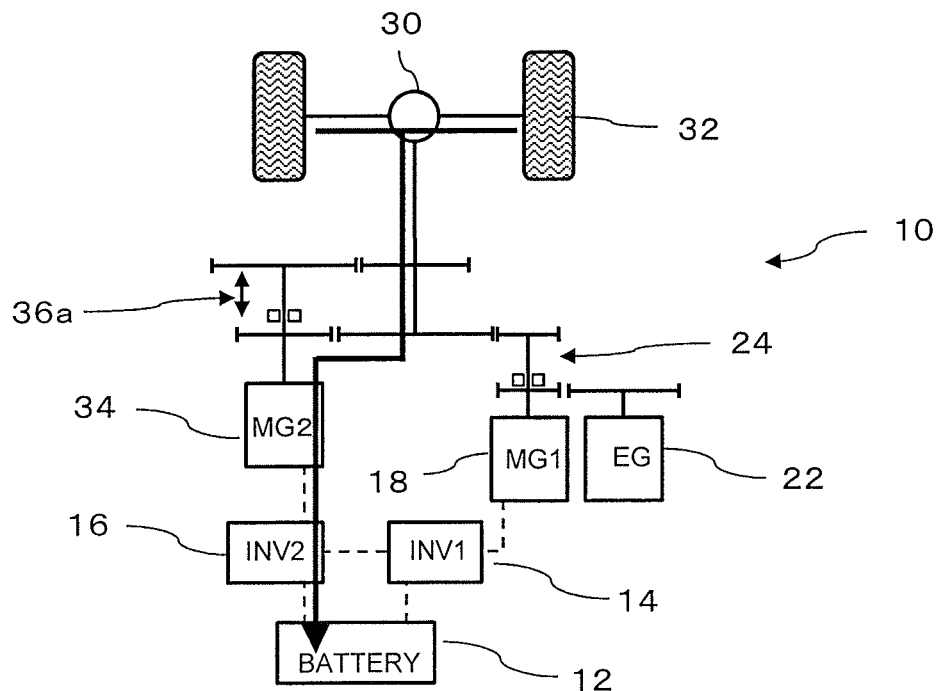
FIG. 7 is a diagram showing the second motor generator 34 regenerating electric power.
Figure 8:
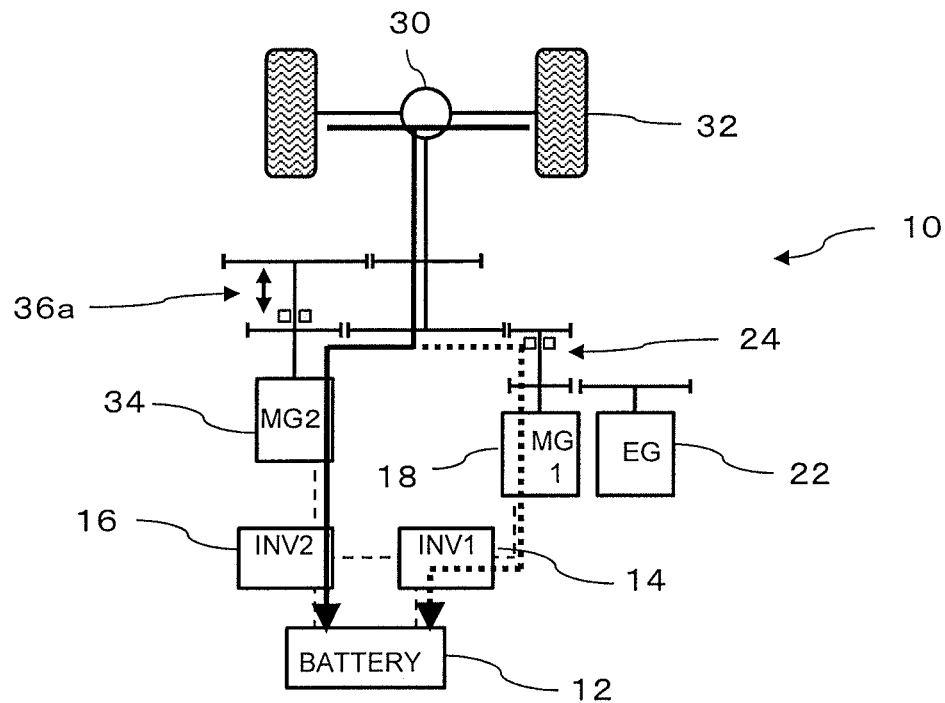
FIG. 8 is a diagram showing the first and second motor generators 18 and 34 regenerating electric power.
Figure 9:
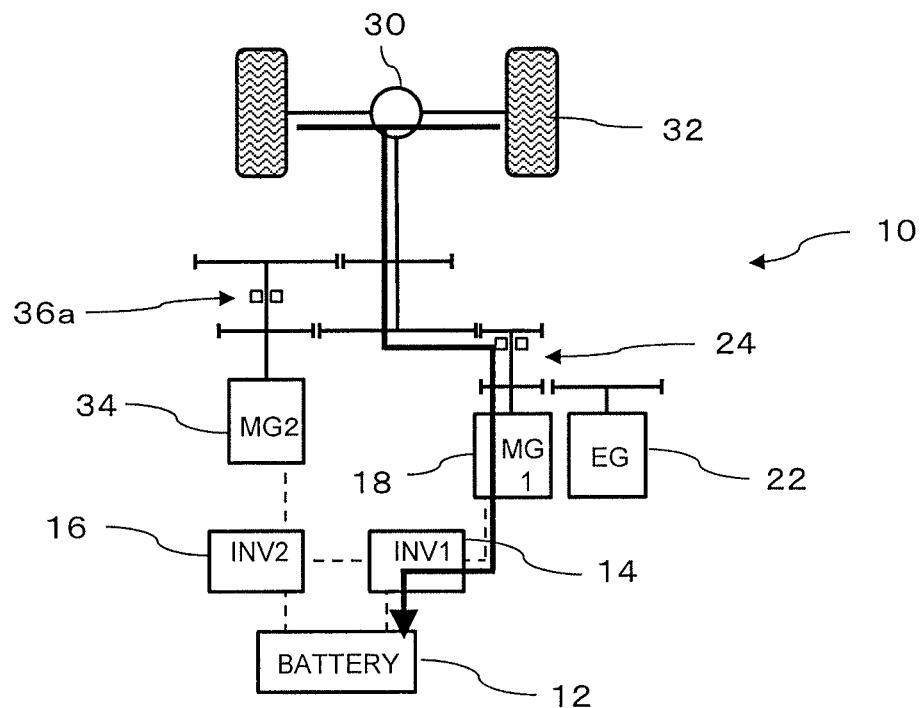
FIG. 9 is a diagram showing the first motor generator 18 regenerating electric power.
Figure 10:
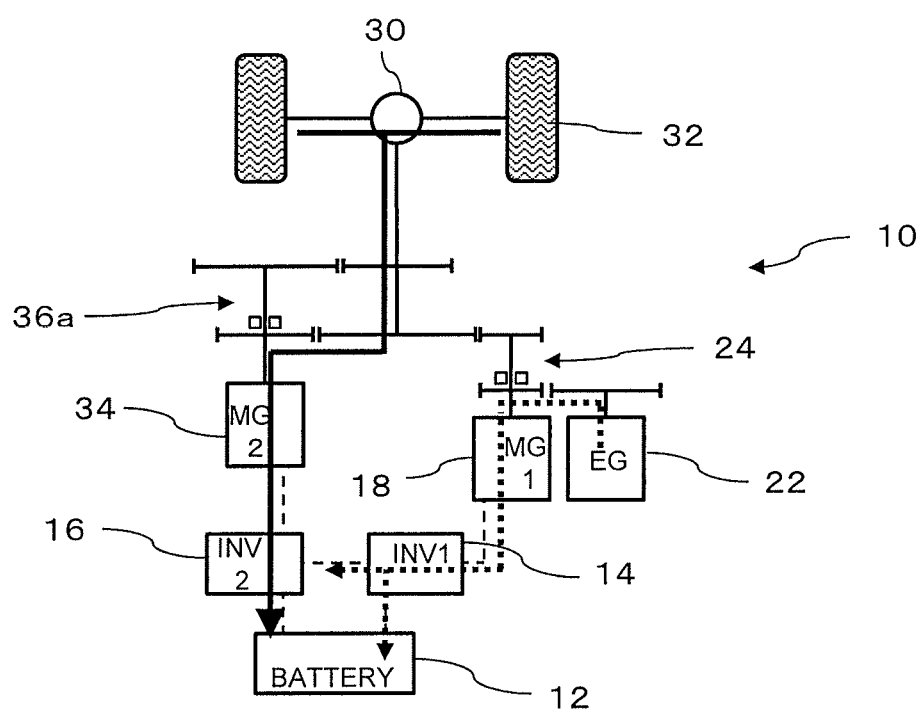
FIG. 10 is a diagram showing the second motor generator 34 regenerating electric power and the first motor generator 18 generating electric power.

| | CLUTCH AND TRANSMISSION | | POWER UNIT | | | | |
|---|---|---|---|---|---|---|---|
| | CLUTCH | TRANSMISSION | EG | MG1 | MG2 | BATTERY | DRAWINGS |
| REGENERATION MODE | EG or N | REDUCTION GEAR A or B | STOP | STOP | GENERATE POWER | CHARGE | FIG. 7 |
| | DRIVE SHAFT | ↑ | ↑ | GENERATE POWER | ↑ | ↑ | FIG. 8 |
| | DRIVE SHAFT | N | ↑ | ↑ | STOP | ↑ | FIG. 9 |
| | EG | REDUCTION GEAR A or B | DRIVE | GENERATE POWER | GENERATE POWER | ↑ | FIG. 10 |

Here, in Table 1, "N" for the clutch 24 indicates "neutral." In addition, for the transmission, "reduction gear ratio A" indicates the reduction gear for normal traveling, and "reduction gear ratio B" indicates the reduction gear for high-speed traveling.

<EV Traveling Mode 1>

This EV traveling mode 1 is a normal traveling mode, and the vehicle travels using one of the first motor generator 18 and the second motor generator 34.

(i) FIG. 4: Normal State (the First Motor Generator 18 is Driven)

The clutch 24 connects an output shaft of the first motor generator 18 to the vehicle drive shaft 28 via the reduction gear 26. The transmission 36 is set to the neutral position because it does not transmit power. The engine 22 and the second motor generator 34 stop, and the first motor generator 18 is driven by electric power from the battery 12. The battery 12 is in the discharging state.

As shown in FIG. 4, electric power from the battery 12 is supplied to the first motor generator 18 via the first inverter 14, and the driving power of the first motor generator 18 is transmitted to the wheels 32.

(ii) FIG. 2: Normal State (the Second Motor Generator 34 is Driven: Reduction Gear Ratio A)

The clutch 24 is set to the neutral position or connects the output shaft of the first motor generator 18 to the engine 22 via the reduction gear 20. The transmission 36 has the reduction gear ratio A which is a larger reduction gear ratio. The engine 22 and the first motor generator 18 stop, and the second motor generator 34 is driven by electric power from the battery 12. The battery 12 is in the discharging state.

As shown in FIG. 2, electric power from the battery 12 is supplied to the second motor generator 34 via the second inverter 14, and the driving power of the second motor generator 34 is changed in speed according to the reduction gear ratio A in the transmission 36 and transmitted to the wheels 32.

(iii) FIG. 3: High-Speed State (the Second Motor Generator 34 is Driven: Reduction Gear Ratio B)

Although this case is basically similar to (ii) FIG. 2, the transmission 36 has the reduction gear ratio B which is a smaller reduction gear ratio. Therefore, higher speed traveling becomes possible by the driving power of the second motor generator 34 as shown in FIG. 3.

Figure 11:
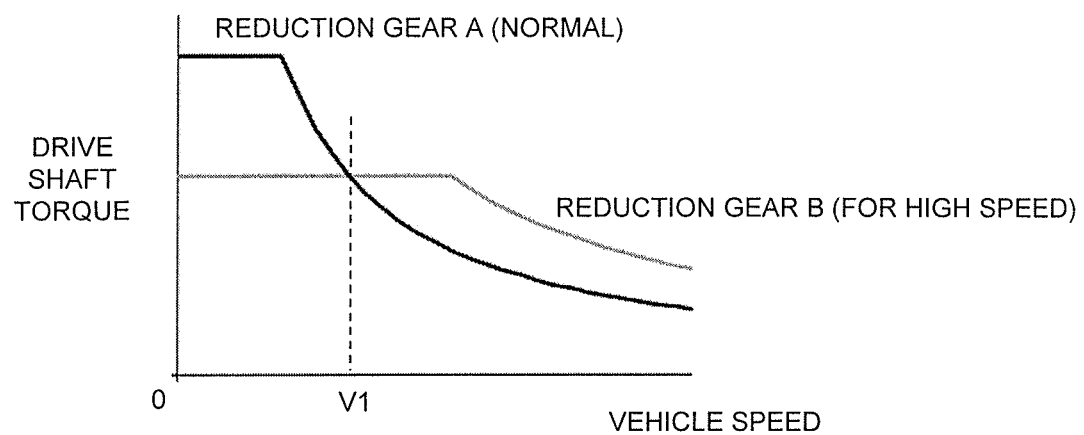
FIG. 11 is a graph showing the relationship between a torque of a vehicle drive shaft 28 using a transmission 36 and the vehicle speed.

Here, FIG. 11 shows a relationship between a torque of the vehicle drive shaft 28 using the transmission 36 and the vehicle speed. Assuming that the vehicle speed at which torques of the vehicle drive shaft according to the reduction gear ratio A and the reduction gear ratio B are identical is V1, when the vehicle speed is less than V1, the reduction gear ratio A is used, while when the vehicle speed is V1 or greater, the reduction gear ratio B is used.

Thus, compared to the case where a single reduction gear ratio (reduction gear ratio A or reduction gear ratio B) is used, it becomes possible to make drive shaft torques larger at all vehicle speeds, thereby improving acceleration performance of the vehicle.

Furthermore, in this case, the second motor generator 34 has a larger output than the first motor generator 18. Accordingly, in normal driving, the second motor generator 34 is used more often to drive the vehicle. However, for example, when relatively low output continues, the first motor generator 18 enables more efficient driving than the second motor generator 34. Thus, switching may be performed between the first motor generator 18 and the second motor generator 34, depending on which motor generator enables more efficient traveling.

<EV Traveling Mode 2>

FIG. 5: High-Speed State (The first and second motor generators 18 and 34 are driven: reduction gear ratio B)

In this EV traveling mode 2, the vehicle travels using both the first motor generator 18 and the second motor generator 34. This mode is used when an acceleration request is high, and a requested output torque is large, or when more efficient traveling is possible compared to the case where the vehicle travels using a single motor generator.

The clutch 24 connects the drive shaft of the first motor generator 18 to the vehicle drive shaft 28 via the reduction gear 26. The engine 22 then stops. The drive shaft of the second motor generator 34 is also connected to the vehicle drive shaft 28 via the transmission 36. Then, as shown in FIG. 5, the first motor generator 18 and the second motor generator 34 are driven by electric power from the battery 12, and the vehicle travels using power from both motor generators. The battery 12 is in the discharging state to obtain required driving power.

Although, in FIG. 5, the reduction gear ratio A is selected in the transmission 36, the reduction gear ratio A is used in a normal state, while the reduction gear ratio B is used in a high-speed state.

<Engine Power Generation Mode>

FIG. 6: (The first motor generator 18 generates electric power, and the second motor generator 34 drives the vehicle)

In this engine power generation mode, the engine is driven, and the first motor generator 18 generates electric power. The second motor generator 34 is used for traveling.

The clutch 24 connects the drive shaft of the first motor generator 18 to the engine 22 via the reduction gear 20. The engine 22 is driven, and the first motor generator 18 generates electric power. The second motor generator 34 is driven to drive the vehicle drive shaft 28 via the transmission 36.

If the amount of power generated by the first motor generator 18 is greater than the amount of electric power required for the second motor generator 34, the battery 12 is charged with surplus electric power. If the amount of power generated by the first motor generator 18 is smaller than the amount of electric power required for the second motor generator 34, electricity is discharged from the battery 12.

Although, in FIG. 6, the reduction gear ratio A is selected in the transmission 36, the reduction gear ratio A is used in a normal state, while the reduction gear ratio B is used in a high-speed state.

<Regeneration Mode>

In this regeneration mode, regenerative braking is performed during vehicle deceleration to thereby charge the battery 12 with generated electric power. Both the first motor generator 18 and the second motor generator 34 can be utilized as a generator. Therefore, when one of the first motor generator 18 and the second motor generator 34 is used, a configuration that enables highly efficient regeneration is adopted from among the cases using them. In the regeneration mode, the engine 22 stops.

FIG. 7: (The second motor generator 34 regenerates electric power)

In the configuration in FIG. 7, the second motor generator 34 is utilized to regenerate electric power. The first motor generator 18 stops, and the clutch 24 is connected to the engine 22 via the reduction gear 20 or is set to the neutral position. The transmission 36 selects one of the reduction gear ratio A and the reduction gear ratio B that is more efficient. Therefore, power from the wheels 32 is input to the second motor generator 34 via the vehicle drive shaft 28 and the transmission 36, and the battery 12 is charged with electric power generated by the second motor generator 34, via the second inverter 16.

FIG. 8: (The first and second motor generators 18 and 34 regenerate electric power)

In the configuration in FIG. 8, both the first motor generator 18 and the second motor generator 34 are utilized to regenerate electric power. The clutch 24 connects the drive shaft of the first motor generator 18 to the vehicle drive shaft 28 via the reduction gear 26. The transmission 36 selects the one of the reduction gear ratio A and the reduction gear ratio B that is more efficient. Therefore, power from the wheels 32 is input, via the vehicle drive shaft 28, to the reduction gear 26 and the first motor generator 18, as well as to the transmission 36 and the second motor generator 34. Thus, the battery 12 is charged with electric power generated by both the first motor generator 18 and the second motor generator 34.

FIG. 9: (The first motor generator 18 regenerates electric power)

In the configuration in FIG. 9, the first motor generator 18 is utilized to regenerate electric power. The second motor generator 34 stops. The clutch 24 connects the drive shaft of the first motor generator 18 to the vehicle drive shaft 28 via the reduction gear 26. The transmission 36 is set to the neutral position because it does not transmit power. Power from the wheels 32 is input to the first motor generator 18 via the vehicle drive shaft 28 and the reduction gear 26, and the battery 12 is charged with electric power generated by the first motor generator 18, via the first inverter 14.

FIG. 10: (The second motor generator 34 regenerates electric power, and the first motor generator 18 generates electric power)

In the configuration in FIG. 10, the second motor generator 34 is utilized to regenerate electric power. In addition, the engine 22 is driven, and the first motor generator 18 generates electric power by connecting the engine 22 to the drive shaft of the first motor generator 18 by the clutch 24. The battery 12 is charged with generated electric power. This configuration is similar to that in FIG. 6 in terms of driving the engine 22 and generating electric power using the first motor generator 18. In addition, although, in FIG. 10, the transmission 36 adopts the reduction gear ratio A, it may adopt the reduction gear ratio B.

<Others>

The traveling modes listed in Table 1 are not all the possible traveling modes, and there are more traveling modes. For example, a reverse mode can be achieved by counter-rotating the first motor generator 18 or the second motor generator 34 that is being driven in the connection state similar to that in the normal state of EV traveling mode 1. The transmission 36 may be a three or more-stage transmission, instead of the two-stage transmission.

<Effects of Embodiment>

In the present embodiment, a number of traveling modes can be implemented by switching the first and second reduction gears 20 and 26, the clutch 24, and the transmission 36 as appropriate by the controller 38. In particular, the driving power of the first motor generator 18 is also utilized as the driving power for the vehicle by switching the clutch 24, and therefore, the driving power of both the first motor generator 18 and the second motor generator 34 can be utilized in a high-speed and high-load state. Thus, it is possible to set an output from the second motor generator 34 to be relatively small and also make the dimension of the second motor generator 34 small. It also becomes possible to lower an output of the second inverter 16 required to drive the second motor generator 34, which leads to cost reduction. Furthermore, in a low load state, the driving power of the motor generator that is more efficient (e.g. the first motor generator 18) can be utilized, and therefore, it is also possible to enhance the system efficiency, improve power consumption, and reduce battery capacity.

The invention claimed is:

1. A series hybrid vehicle equipped with an engine, a first motor generator, and a second motor generator, the series hybrid vehicle comprising:
    a first power transmission mechanism that engages the engine with the first motor generator;
    a second power transmission mechanism that engages the first motor generator with a vehicle drive shaft;
    a clutch that is capable of engaging the first motor generator with one of the first power transmission mechanism and the second power transmission mechanism in a switching manner; and
    a transmission that switches between transmission gear ratios and engages the second motor generator with the vehicle drive shaft.

2. The series hybrid vehicle according to claim 1 further comprising a controller that changes traveling modes by switching engagement states of the clutch and the transmission, wherein the series hybrid vehicle includes, as the traveling modes,
    an EV traveling mode 1 in which the vehicle travels using one of the first motor generator and the second motor generator,
    an EV traveling mode 2 in which the vehicle travels using both the first motor generator and the second motor generator,
    an engine power generation mode in which the vehicle travels using the second motor generator while the engine and the first motor generator generate electric power, and
    a regeneration mode in which one or both of the first motor generator and the second motor generator regenerate electric power.

3. The series hybrid vehicle according to claim 1, wherein
the first power transmission mechanism includes a first reduction gear that engages the engine with the vehicle drive shaft at a fixed reduction gear ratio,
the second power transmission mechanism includes a second reduction gear that engages the first motor generator with the vehicle drive shaft at a fixed reduction gear ratio, and
the clutch selects one of three states: the drive shaft of the first motor generator is engaged with the first reduction gear; the drive shaft of the first motor generator is engaged with the second reduction gear; and the drive shaft of the first motor generator is engaged with neither the first reduction gear nor the second reduction gear.

4. The series hybrid vehicle according to claim 2, wherein
the first power transmission mechanism includes a first reduction gear that engages the engine with the vehicle drive shaft at a fixed reduction gear ratio,
the second power transmission mechanism includes a second reduction gear that engages the first motor generator with the vehicle drive shaft at a fixed reduction gear ratio, and
the clutch selects one of three states: the drive shaft of the first motor generator is engaged with the first reduction gear; the drive shaft of the first motor generator is engaged with the second reduction gear; and the drive shaft of the first motor generator is engaged with neither the first reduction gear nor the second reduction gear.

* * * * *